(12) United States Patent
Watanabe

(10) Patent No.: US 8,483,231 B2
(45) Date of Patent: Jul. 9, 2013

(54) COMMUNICATION SYSTEM, COMMUNICATION METHOD IN COMMUNICATION SYSTEM, AND RELAY DEVICE

(75) Inventor: Naotoshi Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 499 days.

(21) Appl. No.: 12/546,009

(22) Filed: Aug. 24, 2009

(65) Prior Publication Data

US 2009/0310541 A1 Dec. 17, 2009

Related U.S. Application Data

(63) Continuation of application No. PCT/JP2007/000333, filed on Mar. 29, 2007.

(51) Int. Cl.
*H04L 12/28* (2006.01)

(52) U.S. Cl.
USPC .......................... 370/400; 370/401; 709/229

(58) Field of Classification Search
USPC .......... 370/328, 392, 400, 401, 230; 709/227, 709/228, 229; 379/88.17
See application file for complete search history.

(56) References Cited

U.S. PATENT DOCUMENTS

| | | |
|---|---|---|
| 2005/0213591 A1 | 9/2005 | Nakazawa et al. |
| 2006/0218302 A1 | 9/2006 | Chia et al. |
| 2009/0073919 A1* | 3/2009 | Chen .............................. 370/328 |

FOREIGN PATENT DOCUMENTS

| | | |
|---|---|---|
| EP | 1 619 917 | 1/2006 |
| JP | 2004-320159 | 11/2004 |
| JP | 2005-278077 | 10/2005 |

OTHER PUBLICATIONS

International Search Report and Written Opinion of International Application No. PCT/JP2007/000333, dated Jun. 21, 2007.
Global System for Mobile Communications; 3GPP TR 23.882 V1.8.0 (2007-02); 3rd Generation Partnership Project; Technical Specification Group Services and System Aspects; "3GPP System Architecture Evolution: Report on Technical Options and Conclusions"; (Release 7); Dated Feb. 2007. [Ref: Int'l Search Report dated Jun. 21, 2007].
Qualcomm Europe, Lucent, LG Electronics, Nortel; "UE Initiated QoS in SAE"; S2-062818;Discussion/Approval; Agenda Item: 5.1; 3GPP TSG SA WG2 Architecture—SAE Ad-Hoc; Sophia Antipolis, France; Dated Aug. 23-26, 2006. [Ref: Intl Search Report, dated Jun. 21, 2007].

* cited by examiner

*Primary Examiner* — Dady Chery
(74) *Attorney, Agent, or Firm* — Myers Wolin, LLC

(57) ABSTRACT

A communication system, including: a first mobile station; a first node; a first QoS server; a second mobile station; and a second QoS server, wherein the first node includes a first transfer unit which receives a QoS request for requesting to set a QoS channel from the first mobile station and transfers the QoS request to the first QoS server; and a management unit which instructs the first QoS server to transfer the QoS request if it is judged that the second mobile station is accommodated, the first transfer unit transfers the QoS request to the second QoS server based on the instruction from the management unit, and the second QoS server includes a QoS setting message output unit which outputs a QoS setting message to instruct setting of a QoS channel to said second mobile station based on the QoS request.

11 Claims, 11 Drawing Sheets

COMMUNICATION SYSTEM, COMMUNICATION METHOD IN COMMUNICATION SYSTEM, AND RELAY DEVICE

CROSS REFERENCE TO RELATED APPLICATION

This application is a continuation of International Application No. PCT/JP2007/000333, filed on Mar. 29, 2007, the entire contents of which are incorporated herein by reference.

FIELD

The embodiments discussed herein are related to a communication system, a communication method in a communication system, and a relay device.

BACKGROUND

At 3GPP (3rd Generation Partnership Project), a QoS (Quality of Service) setting method for the next generation mobile communication system, based on a network initiated (NW-initiated) method which sets from the network side using an application-based decision, is under consideration, instead of a conventional user equipment initiated (UE-initiated) method (e.g. Non-patent Document 1).

However it is also proposed to use both UE-initiated and NW-initiated for quick handling of new services for which the network side has no QoS design rule in advance, among other reasons (e.g. Non-patent Document 2).

On the other hand, another disclosed communication system which sets QoS, involves a central server which collects packet monitoring and access information from all the terminals in a management domain thereof, decides the operation for each terminal to perform, referring to the information, such as the service level, that is set in an individual terminal, so that even an end terminal can handle QoS (e.g. Patent Document 1).

Non-patent Document 1: 3GPP TR 23.882 V1.8.0 (2007-February), "3GGP System Architecture Evolution: Report on Technical Options and Conclusions"

Non-patent Document 2: Qualcomm, Lucent, LG Electronics, Nortel: UE Initiated QoS in SAE", 3GPP S2-062818, August 2006

Patent Document 1: Japanese Patent Application Laid-Open No. 2004-320159

In a mobile communication system, such as a portable telephone, it is important to provide services to the terminals appropriately according to the service contract conditions and the requests from terminals. Promptly providing services is also demanded. In the above mentioned Patent Document 1, information may be exchanged between a terminal and a home network when a QoS channel is setup, so it takes time to set the QoS.

SUMMARY

Accordingly, it is an object in one aspect of the invention to provide a communication system, a communication method in the communication system, and a relay device which can set QoS appropriately.

It is another object in another aspect of invention to provide a communication system, a communication method in the communication system, and a relay device which sets QoS quickly.

According to an aspect of the invention, a communication system including: a first mobile station; a first node which accommodates the first mobile station; a first QoS server which holds service conditions of the first mobile station; a second mobile station which is a communication counterpart of the first mobile station; and a second QoS server which holds service conditions of the second mobile station, wherein the first node includes a first transfer unit which receives a QoS request for requesting to set a QoS channel from the first mobile station and transfers the QoS request to the first QoS server; and a management unit which judges whether or not the second mobile station is accommodated by the first node based on the QoS request, and instructs the first QoS server to transfer the QoS request if it is judged that the second mobile station is accommodated, the first transfer unit transfers the QoS request to the second QoS server based on the instruction from the management unit, and the second QoS server includes a QoS setting message output unit which outputs a QoS setting message to instruct setting of a QoS channel to said second mobile station based on the QoS request.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The best mode for carrying out the present invention will now be described.

Embodiment 1

Figure 1:
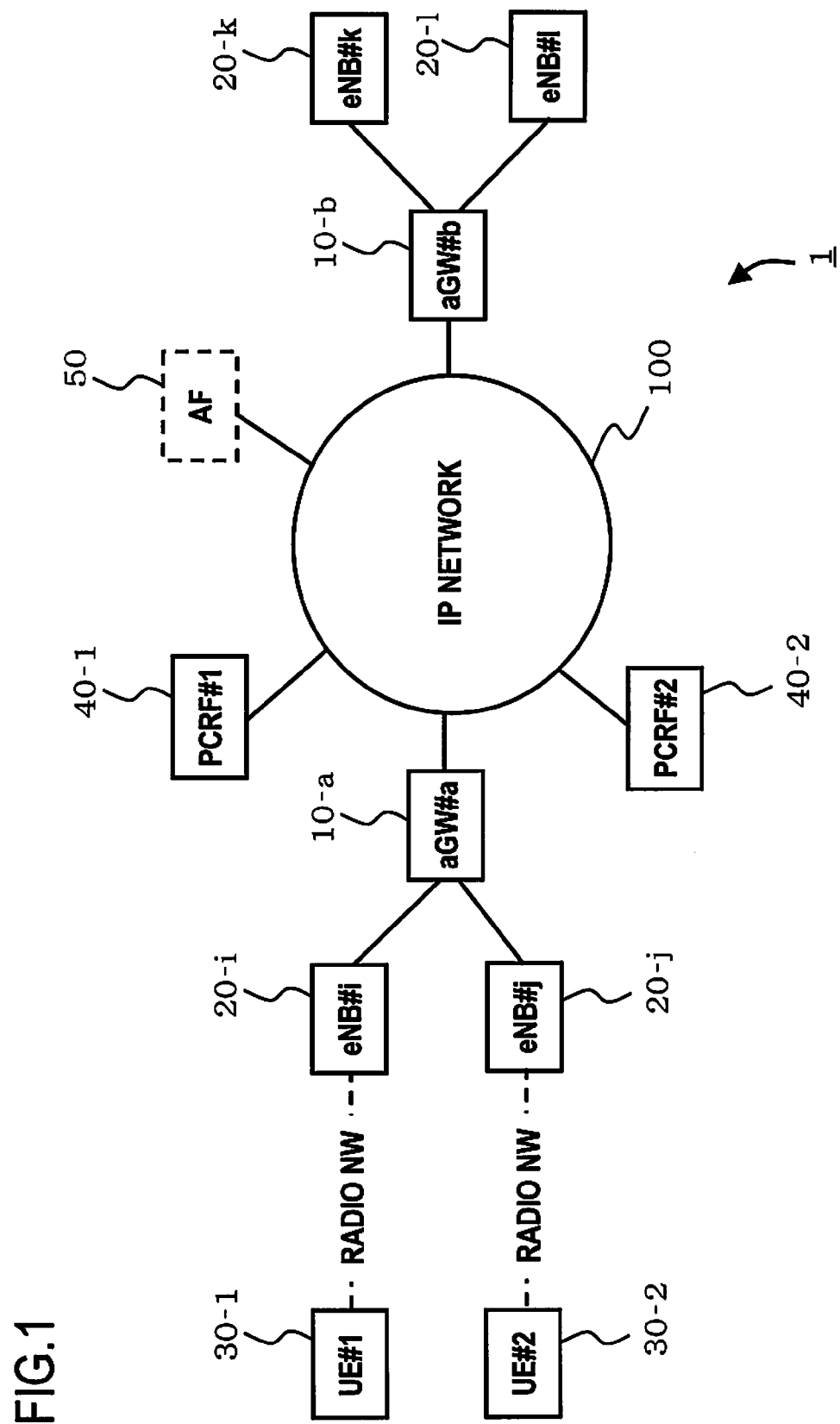
FIG. 1 is a diagram depicting a configuration example of a communication system.

Embodiment 1 will be described first. FIG. 1 is a diagram depicting a configuration example of a communication system 1. The communication system 1 has core network nodes (aGW (access Gate Way)) 10-*a* and 10-*b* as the nodes constituting the core network, radio network management nodes (eNB (evolved Node B)) 20-*i* to 20-*l*, as nodes having a function to manage the radio network, mobile stations (UE (User Equipment)) 30-1 and 30-2, and QoS policy servers (PCRF (Policy and Charging Rule Function)) 40-1 and 40-2. In the communication system 1, an application server (AF) 50, for providing application to mobile stations 30-1 and 30-2, may be connected (indicated by dotted lines in FIG. 1).

The core network nodes 10-a and 10-b are gateway (relay) devices which are connected to the IP network 100 and accommodate the radio access network.

The radio network management nodes 20-i to 20-l are connected to the core network nodes 10-a and 10-b, and control the radio network, extract information, and convert cable transmission signals and radio transmission signals.

The mobile stations 30-1 and 30-2 are connected to the radio network management nodes 20-i to 20-l via the radio network. The mobile stations 30-1 and 30-2 are terminals to which the service is provided, and are such information terminals as a portable telephone and PDA.

The QoS policy servers 40-1 and 40-2 are connected to the IP network 100, and hold and manage QoS service information and accounting policy information (service policy information) for each mobile station 30-1 and 30-2, and output a QoS channel setting message according to the communication status of the mobile stations 30-1 and 30-2.

The configuration depicted in FIG. 1 includes a logical configuration, and the QoS policy servers 40-1 and 40-2, for example, can be one physical unit, but in the example in FIG. 1, two QoS policy servers 40-1 and 40-2 are depicted in order to manage the mobile stations 30-1 and 30-2 respectively.

Figure 2:
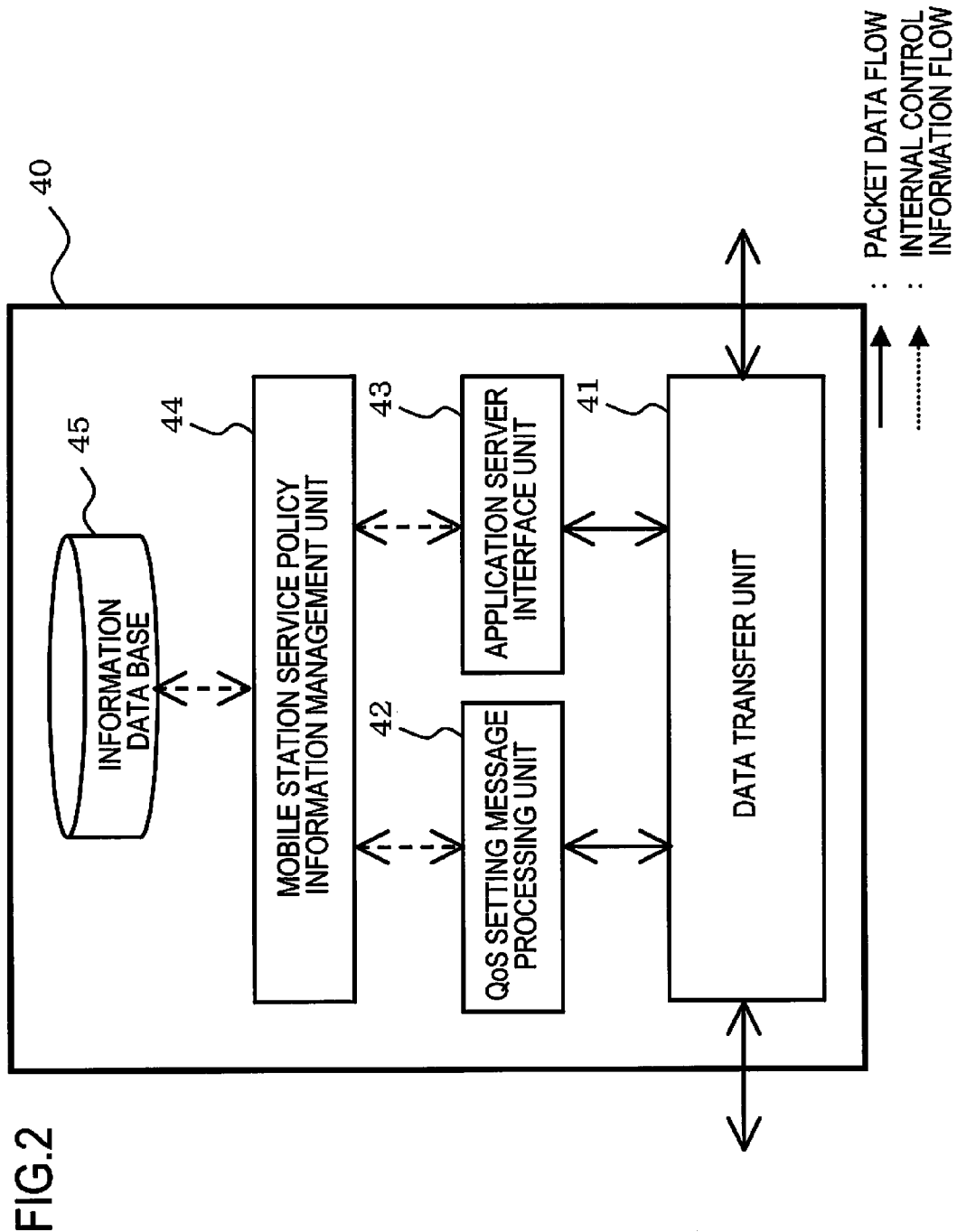
FIG. 2 is a diagram depicting a configuration example of a QoS policy server.
Figure 3:
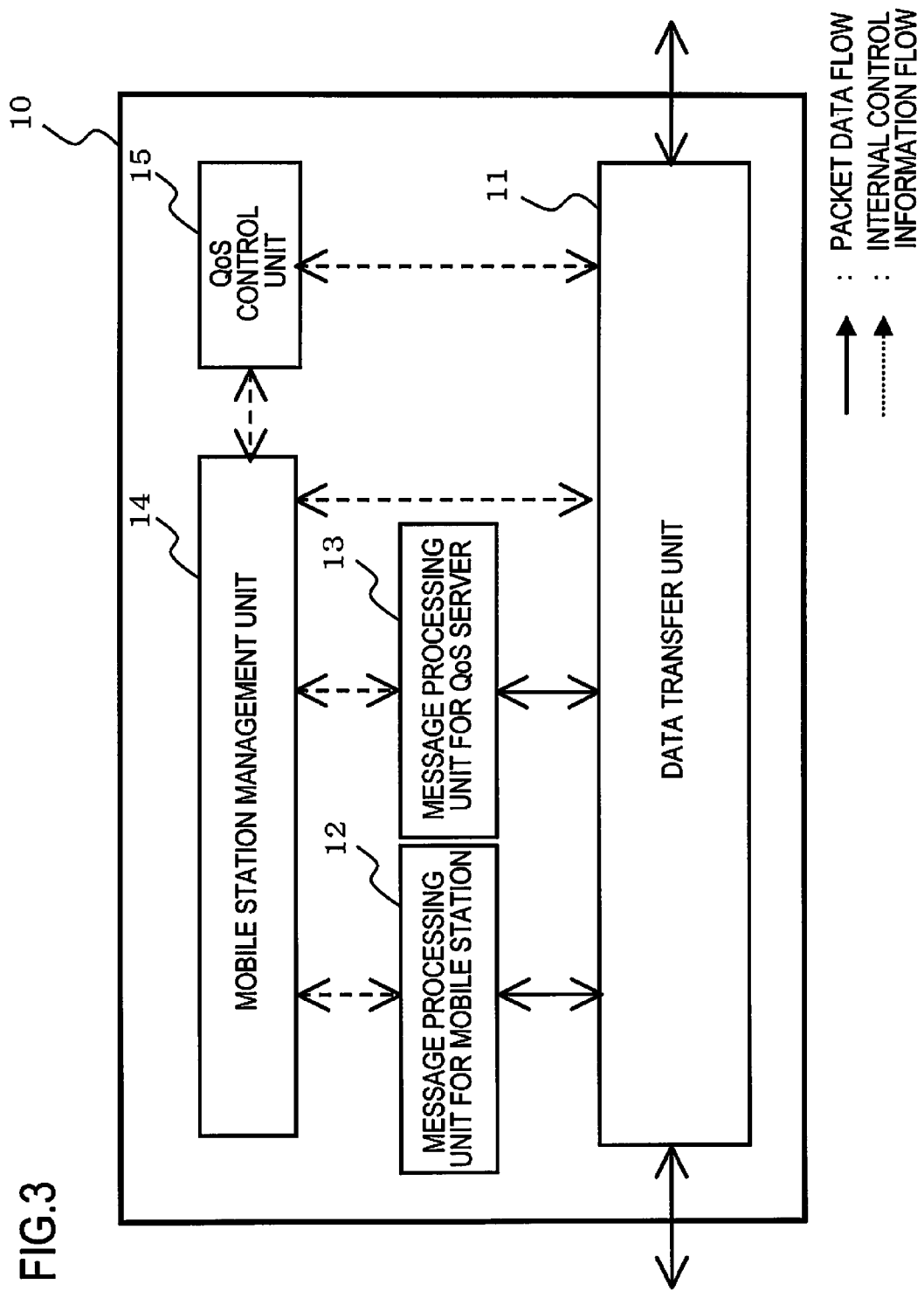
FIG. 3 is a diagram depicting a configuration example of a core network node.

FIG. 2 is a diagram depicting a configuration example of the QoS policy server 40, and FIG. 3 is a diagram depicting a configuration of the core network node 10.

The QoS policy server 40 has a data transfer unit 41, QoS setting message processing unit 42, application server interface unit 43, mobile station service policy information management unit 44 and information data base 45.

The data transfer unit 41 transmits, receives and relays external data, and distributes data to each unit, such as [the QoS setting message processing unit] 42.

The QoS setting message processing unit 42 processes the QoS control message with the core network node 10.

The application server interface unit 43 plays a role of an interface with the application server 50 when the application server 50 is connected, and performs such processing as accepting a QoS request message from the application server 50. The QoS setting message processing unit 42 and the application server interface unit 43 are connected to the data transfer unit 41.

The mobile station service policy information management unit 44 is connected to the QoS setting message processing unit 42 and application server interface unit 43, and receives QoS request information or the like from each unit 42 and 43, reads service policy information (e.g. QoS and accounting) stored in the information data base 45, and decides the service policy.

The information data base 45 holds the service policy information on the mobile station 30. The information data base 45 has a data structure to retrieve the service policy information using an identifier of the mobile station 30 as a retrieval key.

As FIG. 3 depicts, the core network node 10 has a data transfer unit 11, a message processing unit for mobile station 12, a message processing unit for QoS server 13, a mobile station management unit 14, and a QoS control unit 15.

The data transfer unit 11 transmits, receives and relays data with the outside. The data transfer unit 11 identifies data addressed to the local device, and distributes data to each unit, such as the message processing unit for mobile station 12 and so on.

The message processing unit for mobile station 12 performs terminating processing for a QoS control message which is exchanged with the mobile station 30.

The message processing unit for QoS server 13 accepts a QoS request message from the QoS policy server 40. The message processing unit for mobile station 12 and the message processing unit for QoS server 13 are connected to the data transfer unit 11.

The mobile station management unit 14 is connected to the message processing unit for mobile station 12 and the message processing unit for QoS server 13, and sets, maintains and updates the QoS channels based on the information from each processing unit 12 and 13.

Figure 4:
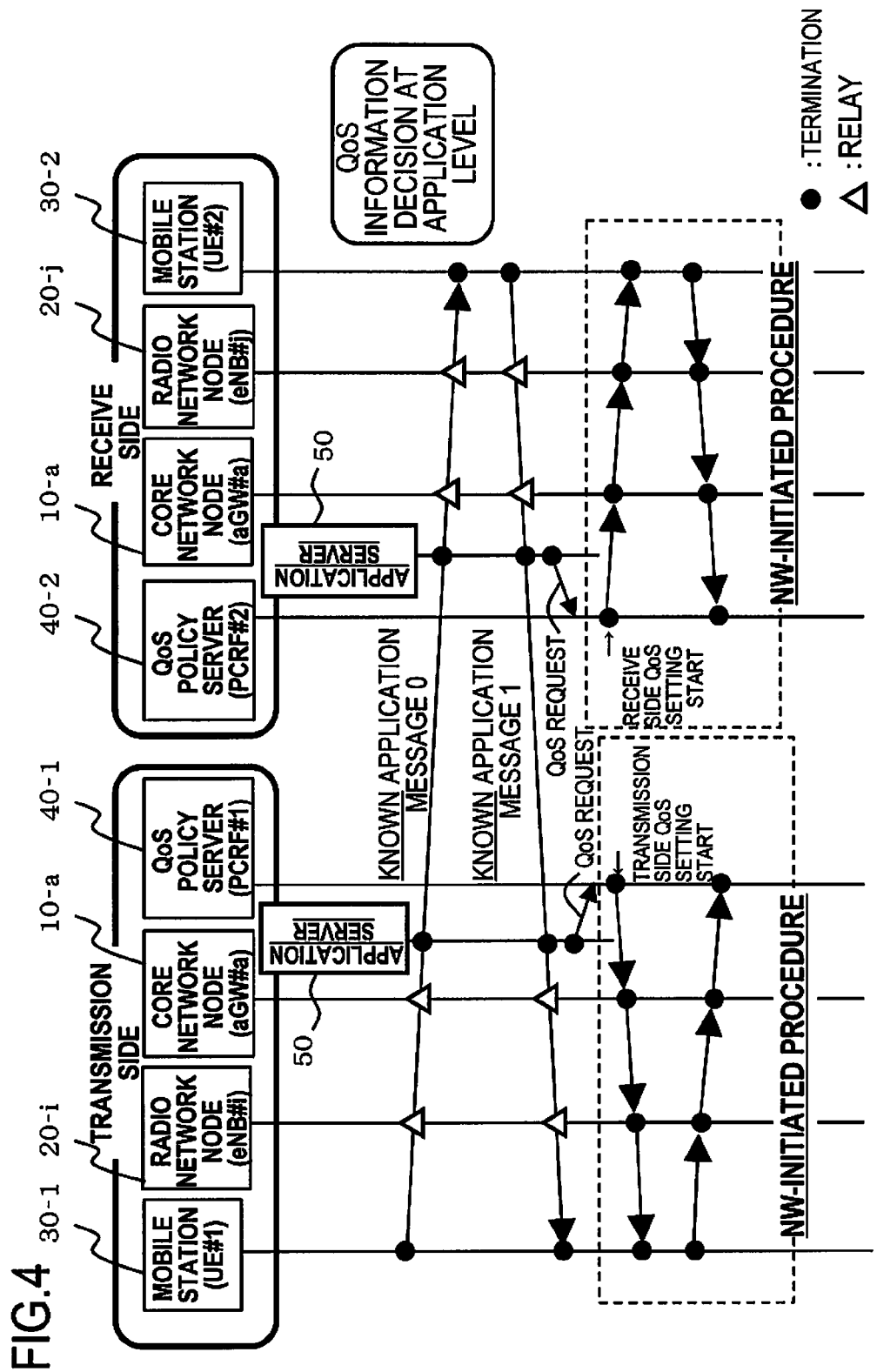
FIG. 4 is a diagram depicting an example of a sequence in the communication system.
Figure 5:
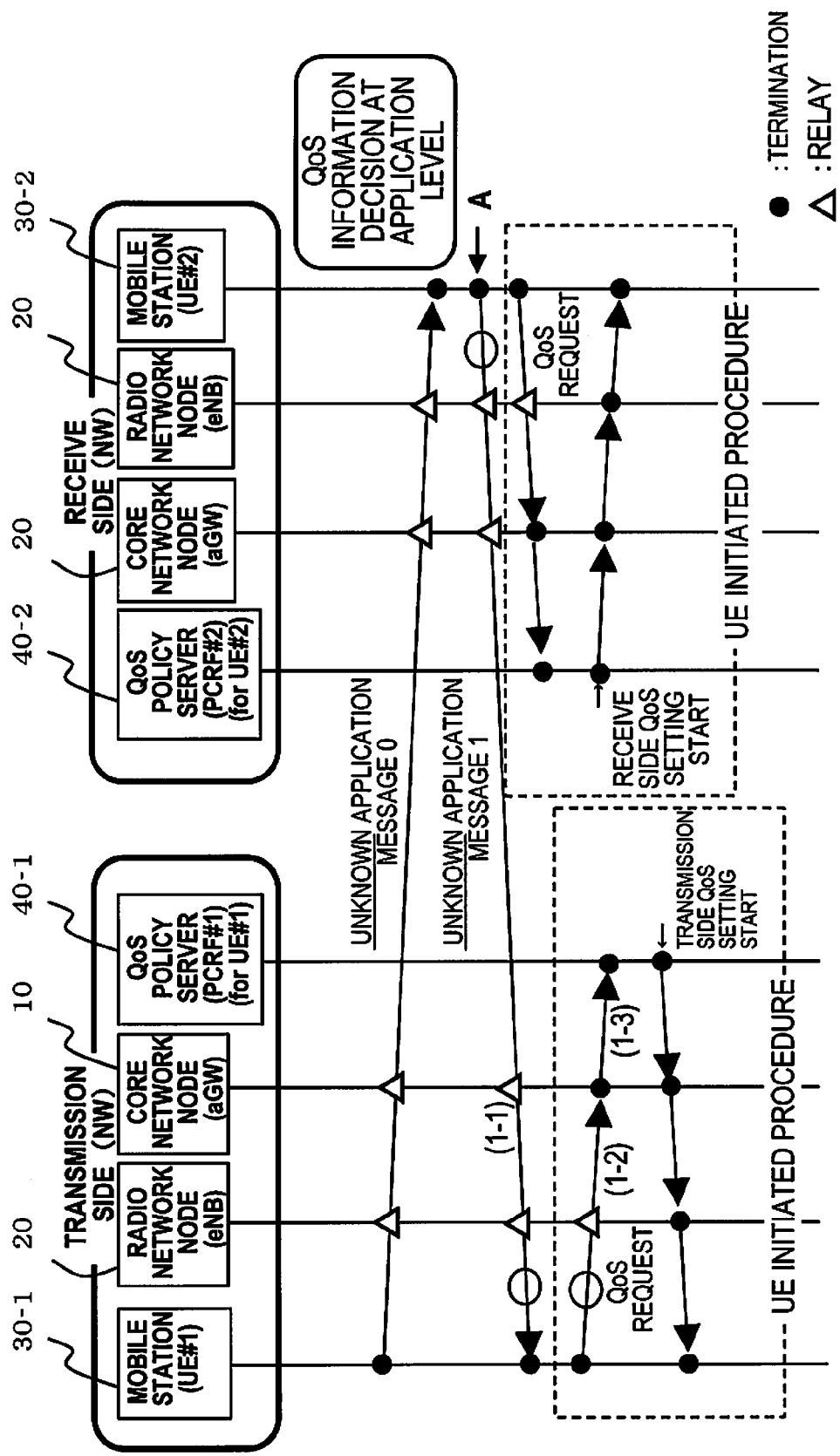
FIG. 5 is a diagram depicting another example of a sequence in the communication system.

Now the operation will be described. FIG. 4 depicts an example of a QoS setting sequence when the application server 50 is connected to the system 1 (that is, when the network side supports the QoS service), and FIG. 5 depicts an example of a QoS setting sequence when the application server 50 is not connected (that is, when the network side does not support the QoS service). In both cases, it is assumed that the mobile station 30-1 is the transmission side, and the mobile station 30-2 is the receive side.

As FIG. 4 depicts, the mobile station 30-1 at the transmission side outputs a message including the information corresponding to QoS in the application level, that is, the QoS request information and the information to indicate the capability of the mobile station 30-1 ("message 0" in FIG. 4). For example, "message 0" in the mobile station 30-1 includes information to receive service in the band "1 to 3 Mbps", and at "mid to high" priority.

"message 0" transmitted from the mobile station 30-1 is transmitted to the mobile station 30-2 at the receive side via a radio network management node 20-i or the like.

When "message 0" is received, the mobile station 30-2 at the receive side decides the QoS information, such as the priority in the application level and the band (e.g. the "3 Mbps" band, and "high" priority) in the application level based on the capability of the mobile station 30-2 and the communication status with other mobile stations. Then the mobile station 30-2 sends a response message including the decided QoS information ("message 1") to the mobile station 30-1.

The response message transmitted from the mobile station 30-2 is sent to the mobile station 30-1 at the transmission side via the radio network management node 20-j or the like.

The application server 50 at the receive side, which received the response message, outputs the QoS request message to the QoS policy server 40-2.

When the QoS request is received, the QoS policy server 40-2 decides a service to provide based on the service information for the mobile station 30-2, which the QoS policy server 40-2 holds. Specifically, as FIG. 2 depicts, the data transfer unit 41 of the QoS policy server 40-2 identifies that the received QoS request message is data from the application server 50, and outputs the QoS request message to the application server interface unit 43. This identification is performed based on address (e.g. IP address to indicate that the transmission source is the application server 50) information included in the QoS request message, for example.

The application server interface unit 43 extracts an identifier of the mobile station 30-2 which receives the service, QoS request information (type of application and service), communication information (e.g. transmission source address, destination address, port number) or the like from the QoS request message, and outputs this information to the mobile station service policy information management unit 44. The mobile station service policy information management unit 44 acquires service policy information of the mobile station 30-2 from the information data base 45 using the identifier of the mobile station 30-2 from the application server interface unit 43, and decides a service policy to be provided responding to the QoS request message. The mobile station service policy information management unit 44 instructs the QoS setting message processing unit 42 to set QoS based on the decided service policy. The QoS setting message processing unit 42 creates a QoS setting request message, and outputs it to the data transfer unit 41. The data transfer unit 41 sends the QoS setting request message to the core network node 10-a.

Referring back to FIG. 4, when the QoS setting request message is received, the core network node 10-a at the receive side outputs the QoS setting request message to the radio network management node 20-j which accommodates the mobile station 30-2. Specifically, the core network node 10-a operates as follows. As FIG. 3 depicts, the data transfer unit 11 of the core network node 10-a identifies that this data is from the QoS policy server 40-2, and outputs the QoS setting request message to the message processing unit for QoS server 13. This identification is performed based on the address information (e.g. IP address of QoS policy server 40-2) included in the QoS setting request message, for example.

The message processing unit for QoS server 13 extracts the QoS setting information (service policy information decided by the QoS policy server 40-2) from the QoS setting request message, and outputs it to the mobile station management unit 14. The mobile station management unit 14 outputs the QoS setting information to the mobile station message processing unit for mobile station 12, and instructs the message processing unit for mobile station 12 to transmit the QoS setting request message to the mobile station 30-2. The QoS setting request message is output from the message processing unit for mobile station 12 to the radio network management node 20-j via the data transfer unit 11. The QoS setting request message includes information on QoS channels (information for routing) between the core network node 10-a and radio network management node 20-j. For example, such information is included in the QoS setting request message by the mobile station management unit 14 holding information on QoS channels, and outputting this information simultaneously when outputting the instruction of the QoS setting request message to the message processing unit for QoS server 13.

Referring back to FIG. 4, the QoS setting request message which is output from the core network node 10-a is output to the radio network management node 20-j. When the QoS setting request is received, the radio network management node 20-j transmits the QoS setting request message, including information on QoS channels, to the mobile station 30-2, similarly to the case of the core network management node 10-a.

The mobile station 30-2 sets QoS based on the QoS setting information, and sends the completion notice to the radio network management node 20-j. The completion notice is output from the radio network management node 20-j to the QoS policy server 40-2 via the core network node 10-a. By this, the receive side can set QoS appropriately.

In the transmission side as well, when the application server 50 receives the response message ("message 1") from the mobile station 30-2, the application server 50 outputs a QoS request message to the QoS policy server 40-1, and the QoS channels are set based on the network-initiated method (NW-initiated), similarly to the case of the receive side.

In this way, QoS can be appropriately set since the application server 50, which relays the service target application, starts the QoS setting based on the response message. Also the QoS request message is output from the application server 50 when relaying the response message, so QoS can be set quickly compared with the case of the mobile station 30-1 sending the QoS setting request to the application server 50 after the response message is received by the transmission side mobile station 30-1.

FIG. 5 is an example when the application servers 50 are not installed (when the network side does not support QoS service).

Similarly to the case of the example in FIG. 4, the mobile station 30-1 at the transmission side sends a message including the QoS request information and capability ("message 0") to the mobile station 30-2 at the receive side. The mobile station 30-2 at the receive side decides the QoS information, and sends the response message ("message 1") to the mobile station 30-1 at the transmission side ((1-1) in FIG. 5).

In this example, the mobile station 30-1, which received the response message, sends the QoS request message since the application server 50 does not exist ((1-2) in FIG. 5). The QoS request message is output to the core network node 10 via the radio network management node 20 or the like. In the core network node 10, the data transfer unit 11 receives the QoS request message from the mobile station 30-1, as depicted in FIG. 3. The data transfer unit 11 identifies that this request message is from the mobile station 30-1, and outputs this message to the message processing unit for mobile station 12. The identification is performed based on the identification (e.g. IP address) of the mobile station 30-1 included in the QoS request message, for example.

The message processing unit for mobile station 12 extracts the identification information or the like of the mobile station 30-1, and outputs the extracted information to the mobile station management unit 14. The mobile station management unit 14 outputs the extracts information to the message processing unit for QoS server 13, and instructs the message processing unit for QoS server 13 to output the QoS request message to the QoS server 40-1. Based on this instruction, the message processing unit for QoS server 13 creates the QoS request message, and outputs it to the data transfer unit 11. The data transfer unit 11 outputs the QoS request message to the QoS policy server 40-1 ((1-3) in FIG. 5).

Referring back to FIG. 5, the QoS policy server 40-1 creates a QoS setting request message, including QoS parameter values, based on this QoS request message, and outputs it to the core network node 10. As FIG. 2 depicts, the data transfer unit 41 of the QoS policy server 40-1 outputs the QoS request message from the core network node 10 to the QoS setting message processing unit 42. The QoS setting message processing unit 42 extracts the identifier or the like of the mobile station 30-1 included in the QoS request message, and outputs it to the mobile station service policy information management unit 44. Based on this extracted information, the mobile station service policy information management unit 44 acquires the service policy information (including QoS parameter values) of the mobile station 30-1 from the information data base 45, and outputs the service policy information to the QoS setting message processing unit 42, and instructs the QoS setting message processing unit 42 to create the QoS setting request message. Based on this instruction, the QoS setting message processing unit 42 creates the QoS setting request message. The created QoS setting request message is output to the core network node 10 via the data transfer unit 41. The setting of QoS channels at the transmission side is started by the output of this QoS setting request message.

This setting request message is sent to the mobile station 30-1 via the radio network management node 20, and the mobile station 30-1 sets QoS based on this message.

At the receive side, the mobile station 30-2 outputs the response message ("message 1"), and then outputs the QoS request message to the radio network management node 20 which accommodates the mobile station 30-2. The QoS request message is output to the QoS policy server 40-2 via the radio network management node 20 and the core network node 10. The QoS policy server 40-2 outputs the QoS setting request message to the mobile station 30-2, in the same manner as the QoS policy server 40-1 at the transmission side. The mobile station 30-2 sets QoS based on this request.

In this way, even if the network side does not support the QoS service, the QoS request message from the mobile station 30-1 at the transmission side or the mobile station 30-2 at the receive side is sent to each node 20 or the like accommodating the mobile stations 30-1 and 30-2, and QoS is set based on the QoS setting request message from the QoS policy servers 40-1 and 40-2, therefore QoS can be set appropriately.

Embodiment 2

Embodiment 2 will now be described. Embodiment 2 is an example for setting QoS quickly.

The configuration of the communication system 1 is the same as Embodiment 1 (see FIG. 1). It is assumed that the mobile station 30-1 is the transmission side and the mobile station 30-2 is the receive side, and the mobile stations 30-1 and 30-2 at the transmission side and the receive side are accommodated by the core network node 10-*a*. The configuration of the QoS policy server 40 and the core network node 10 are also the same as Embodiment 1 (see FIG. 2 and FIG. 3).

Figure 6:
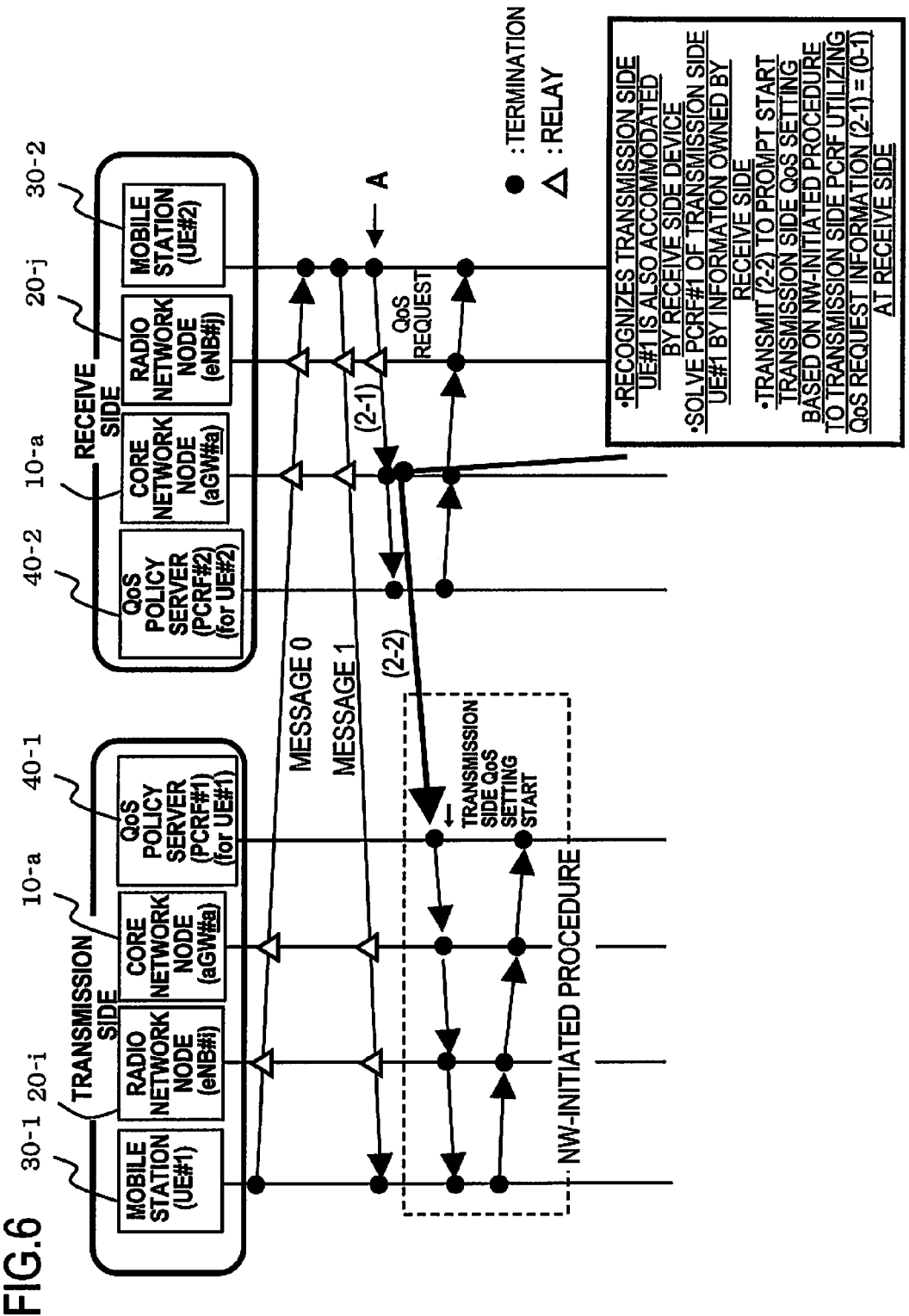
FIG. 6 is a diagram depicting another example of a sequence in the communication system.

FIG. 6 is a diagram depicting a QoS setting sequence example according to Embodiment 2.

First the mobile station 30-1 sends a message including the capability of the mobile station 30-1 and the QoS request message ("message 0") to the mobile station 30-2 at the receive side, in the same manner as in Embodiment 1. When this message is received, the mobile station 30-2 at the receive side decides QoS information including priority and band based on the capability and status of the mobile station 30-2, in the same manner as in Embodiment 1, and sends the response message ("message 1") to the mobile station 30-1 at the transmission side.

When the "message 0" is received, the mobile station 30-2 at the receive side also sends a QoS request message ((2-1) in FIG. 6). The radio network management node 20-*j* relays the QoS request message, and outputs the QoS request message to the core network node 10-*a*.

When the QoS request message is received, the core network node 10-*a* judges whether the counter mobile station 30-1 is a mobile station accommodated by this node 10-*a*, and if judged as an accommodated mobile station, the core network node 10-*a* outputs the QoS request message to the QoS policy server 40-1 which manages the counter mobile station 30-1 ((2-2) in FIG. 6).

An example of this operation is as follows. The mobile station management unit 14 (see FIG. 3) of the core network node 10-*a* holds a table containing an identifier and IP address of each mobile station 30-1 and 30-2 accommodated by this node, and the identifier and IP address of the QoS policy servers 40-1 and 40-2 which manage each mobile station 30-1 and 30-2. When the QoS request message is received from the data transfer unit 11, the message processing unit for mobile station 12 outputs the IP address of the mobile station 30-1 (transmission source in this case) included in this request to the mobile station management unit 14. The mobile station management unit 14 refers to the table, and if the IP address of the counter mobile station 30-1 is in the table, the mobile station management unit 14 judges that this mobile station is accommodated by this node. Then the mobile station management unit 14 reads the identifier and the IP address of the corresponding QoS policy server 40-1 from the table, and instructs the message processing unit for QoS server 13 to output the QoS request message to the QoS policy server 40-1. The message processing unit for QoS server 13 creates a QoS request message addressed to the QoS policy server 40-1, and outputs it to the data transfer unit 11. The data transfer unit 11 outputs the QoS request message to the QoS policy server 40-1.

The core network node 10-*a* also outputs the QoS request message to the QOS policy server 40-2 which manages the mobile station 30-2. The mobile station management unit 14 instructs the message processing unit for QoS server 13 to output this QOS request message. The mobile station management unit 14 can acquire the IP address of the QoS policy server 40-2 by referring to table, and instruct [the message processing unit for QoS server 13] to create a QoS request message addressed to the QoS policy server 40-2. When the instruction is received from the mobile station management unit 14, the message processing unit for QoS server 13 creates the QoS request message addressed to the QoS policy server 40-2, and outputs it to the data transfer unit 11. The data transfer unit 11 outputs the QoS request message to the QoS policy server 40-2.

The core network node 10-*a* attaches identification information to identify the two QoS request messages, and outputs the QoS request messages. The identification information can be attached to the QoS request messages by the message processing unit for QoS server 13. These are the same QoS request messages, but the identifiers are attached to identify the message which the core network node 10 sent to the QoS policy server 40-1 for managing the counter mobile station 30-1.

Figure 8:
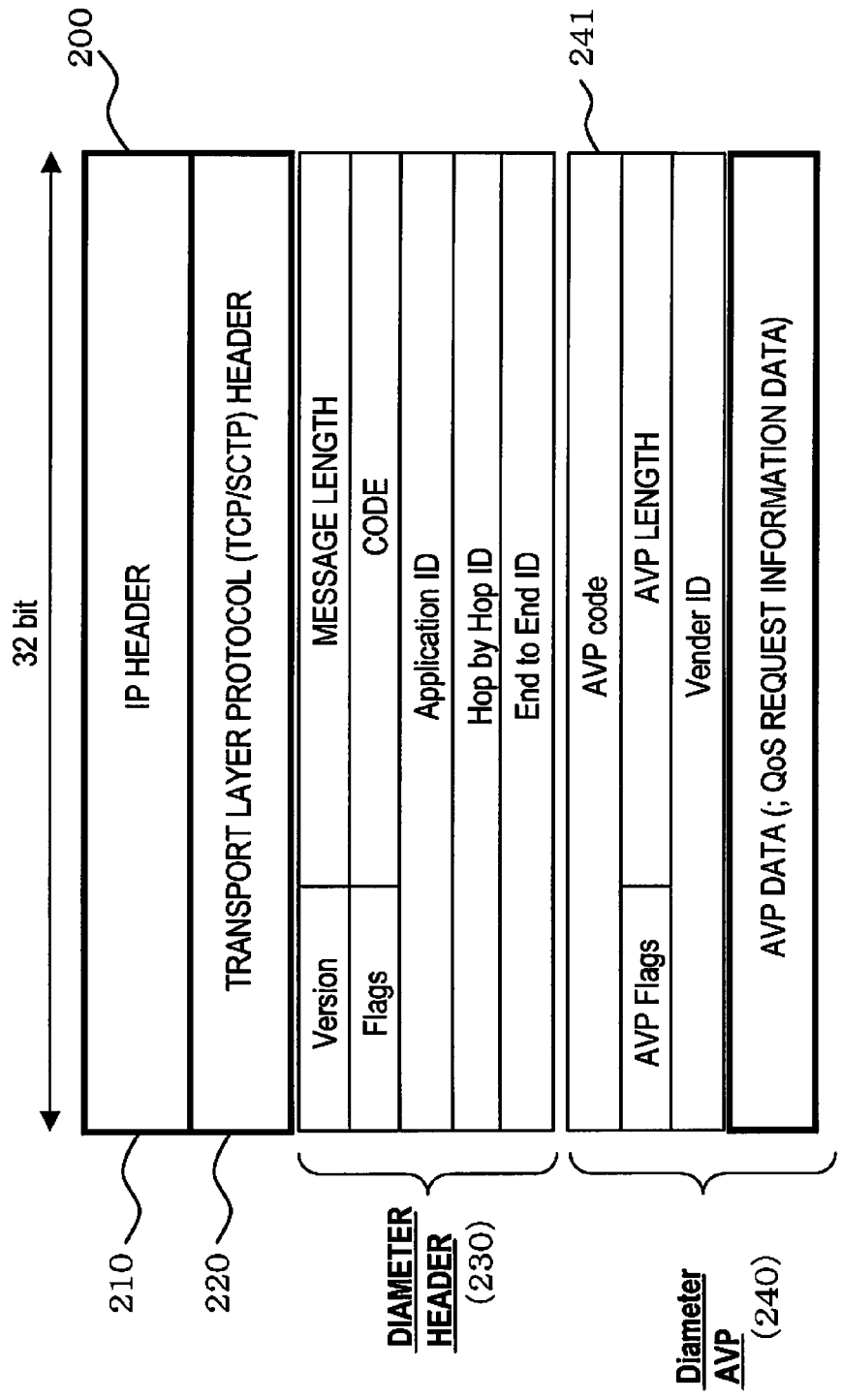
FIG. 8 is a diagram depicting a format example of a QoS request message.

FIG. 8 is an example of the QoS request message which the core network node 10-*a* sends to the QoS policy server 40-1. FIG. 8 depicts a format example of the case of a system using a Diameter protocol, which is one network user authentication protocol between the core network node 10-*a* and the QoS policy server 40-1, and a predetermined code to indicate a QoS request message is inserted in the AVP code field 241, which indicates an AVP (Attribute Value Pair) code having a pair of attribute and value.

Referring back to FIG. 6, when the QoS request message is received from the core network node 10-*a* at the receive side, the QoS policy server 40-1 at the transmission side creates a QoS setting request message for the mobile station 30-1 which this node is managing, and outputs it to the mobile station 30-1. For example, as FIG. 2 depicts, the QoS setting message processing unit 42 outputs the information to indicate that this is the QoS request message received from the core network node 10 and the information extracted from the QoS request message (communication information of the application (e.g. addresses and port Nos. of the transmission and receive sides)) to the mobile station service policy information management unit 44. The mobile station service policy information management unit 44 retrieves the information data base 45 based on the extracted information, and creates a QoS setting information, outputs it to the QoS setting message processing unit 42, and instructs the QoS setting message processing unit 42 to create the QoS setting request message. Based on this instruction, the QoS setting message processing unit 42 creates the QoS setting request message, and outputs it to the data transfer unit 41. The data transfer unit 41 outputs the QoS setting request message to the core network node 10-*a*. Then the QoS setting is started by the network initiated method (NW-initiated) (see FIG. 4).

The QoS policy server 40-1 converts the QoS request message into a request transmitted from the mobile station 30-1 at the transmission side by switching the addresses or the like of the receive side and transmission side. This is to indicate that the QoS setting is requested from the mobile station 30-1 by the user equipment initiated (UE-initiated) procedure from the mobile station 30-1 (see FIG. 5). Hereafter, in the same manner as in Embodiment 1, the QoS setting request message is sent to the mobile station 30-1 via the core network node 10-*a* or the like, and QoS is set by the mobile station 30-1. Then the completion notice is output from the mobile station 30-1 to the QoS policy server 40-1 via the radio network management node 20-*i* or the like, and QoS setting at the transmission side ends.

When the QoS policy server 40-2 at the receive side receives the QOS request message from the core network node 10, on the other hand, the QoS policy server 40-2 creates QoS setting information in the same manner as in Embodiment 1, and outputs the QoS setting request message to the mobile station 30-2. The QoS setting request message is sent to the mobile station 30-2, where QoS is set, and the QoS setting at the receive side ends.

Now the effect of Embodiment 2 will be described. FIG. 5 of Embodiment 1 is an example when the network side does not support the QoS service, in the same manner as in Embodiment 2. Comparing FIG. 5 and FIG. 6, the number of messages from the mobile station 30-2 at the receive side outputting the QoS request message (point "A" in FIG. 5 and FIG. 6) to the QoS policy server 40-1 at the transmission side starting the QoS setting (until outputting the QoS setting request message) is "three messages", (1-1) to (1-3), in the example in FIG. 5 (excluding the number of messages relayed), and is "two messages", (2-1) and (2-2), in the example in FIG. 6. In Embodiment 2, the transfer time can be decreased for the amount of processing one message, and QoS can be set more quickly.

Embodiment 3

Embodiment 3 will now be described. Embodiment 3 is an example when each core network node 10-*a* and 10-*b* accommodate the transmission side and receive side mobile stations 30-1 and 30-2 respectively.

The configurations of the core network nodes 10-*a* and 10-*b* and the QoS policy servers 40-1 and 40-2 are the same as Embodiment 1 or the like.

Figure 7:
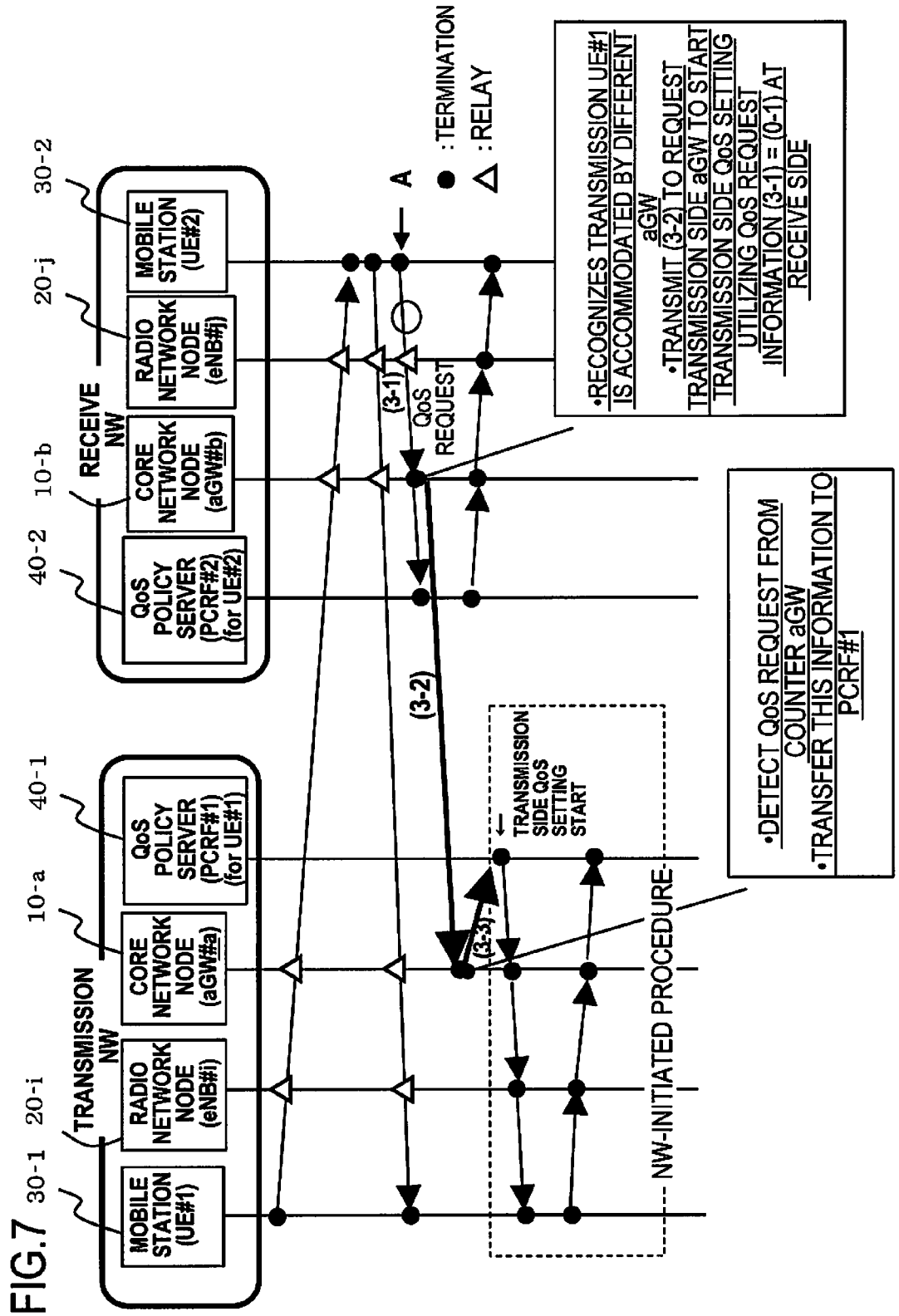
FIG. 7 is a diagram depicting another example of a sequence in the communication system.

FIG. 7 is a diagram depicting an example of a QoS setting sequence in Embodiment 3. In the same manner as in Embodiment 1 or the like, the mobile station 30-1 at the transmission side firstly sends a message including QoS request information and information to indicate a capability of the mobile station 30-1 ("message 0") to the receive side mobile station 30-2 at the receive side. In the same manner as in Embodiment 1, the mobile station 30-2 at the receive side decides the QoS information including priority and band, based on the capability and status of the mobile station 30-2, and sends a response message ("message 1") to the mobile station 30-1 at the transmission side. Then in the same manner as in Embodiment 2, the mobile station 30-2 sends the QoS request message to the radio network management node 20-*j* ((3-1) in FIG. 7).

The QoS request message is output to the core network node 10-*b* via the radio network management node 20-*j*. When the QoS request message is received, the core network node 10-*b* judges whether or not the counter mobile station 30-1 is a mobile station which this node accommodates, in the same manner as in Embodiment 2. In the present embodiment, the counter mobile station 30-1 is managed by the other core network node 10-*a* (information on the counter mobile station 30-1 is not stored in the table of the mobile station management unit 14) and it is judged that [the mobile station 30-1] is not a mobile station accommodated by this node.

If it is judged that the counter mobile station 30-1 is not a mobile station accommodated by this node, the mobile station management unit 14 (see FIG. 3) instructs the data transfer unit 11 to output the QoS request message to the core network node 10-*a* which accommodates the counter mobile station 30-1. For example, when the response message ("message 1") is output to the core network node 10-*a*, the mobile station management unit 14 holds the address (e.g. IP address) of this core network node 10-*a* in the table, and reads this address during the present processing, and instructs [the data transfer unit 11] to create a QoS request message using this address as a destination. Then the data transfer unit 11 outputs the QoS request message to the core network node 10-*a* ((3-2) in FIG. 7).

Figure 9:
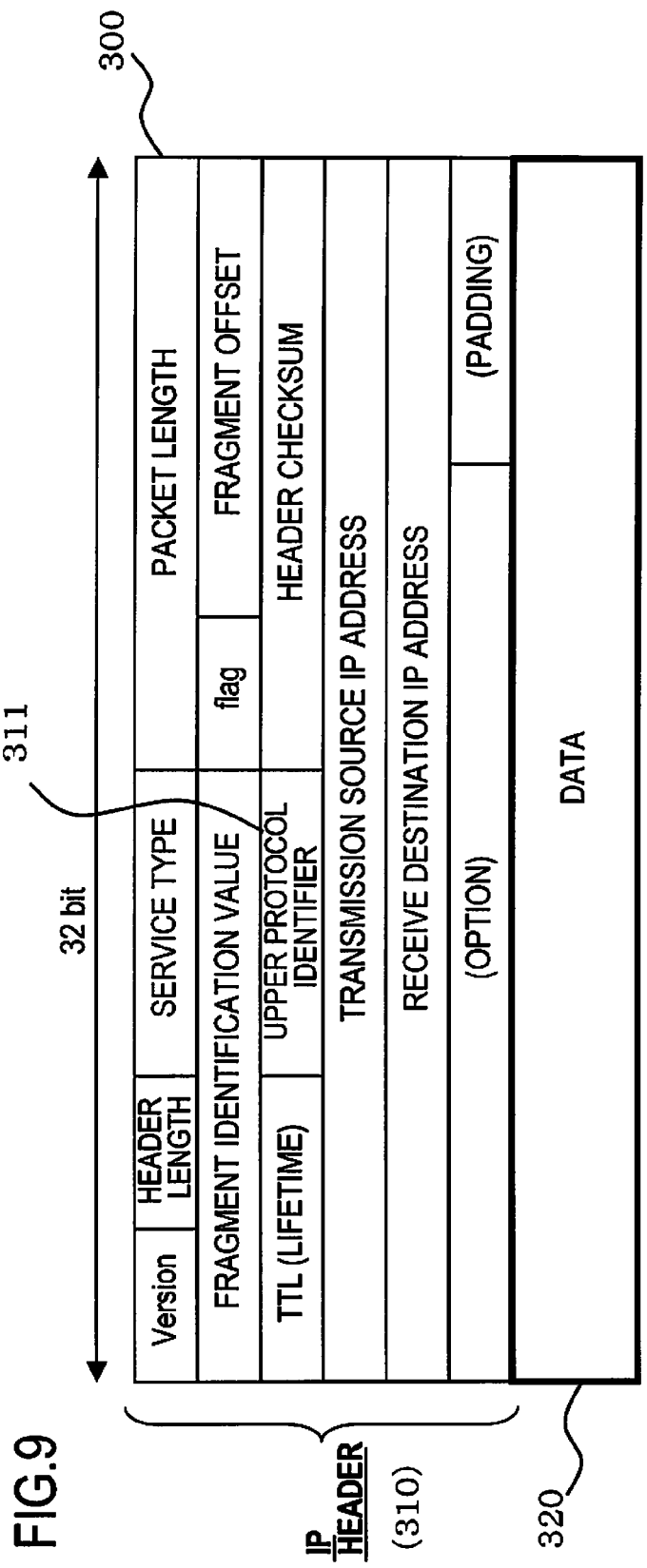
FIG. 9 is a diagram depicting another format example of a QoS request message.

In this case, the data transfer unit 11 attaches information to indicate that the message is a QoS request message, and outputs the QoS request message. FIG. 9 is an example of attaching a predetermined code to indicate a QoS request message to a field 311 for inserting a protocol identifier of the IP protocol.

Figure 10:
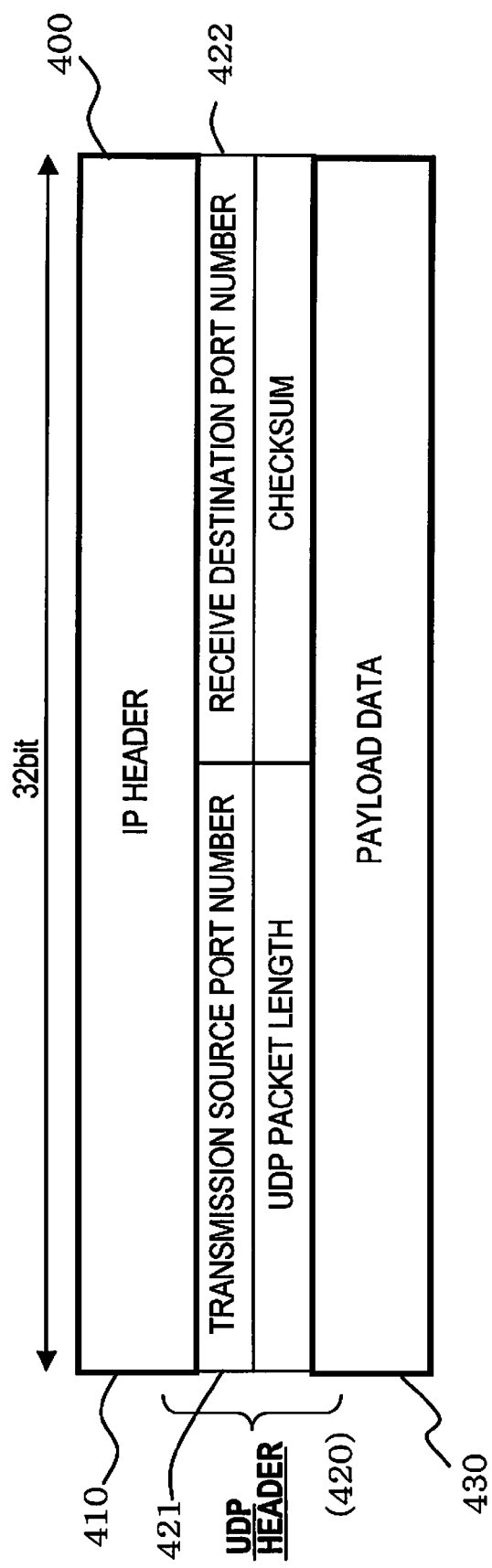
FIG. 10 is a diagram depicting another format example of a QoS request message.

A predetermined port number to indicate a QoS request message may be inserted in a field for inserting a port number of the transport layer protocol. FIG. 10 depicts an example when UDP (User Datagram Protocol) is used for the transport layer protocol, and a predetermined port number is inserted into the fields 421 and 422 for inserting a port number of the UDP header 420.

Figure 11:
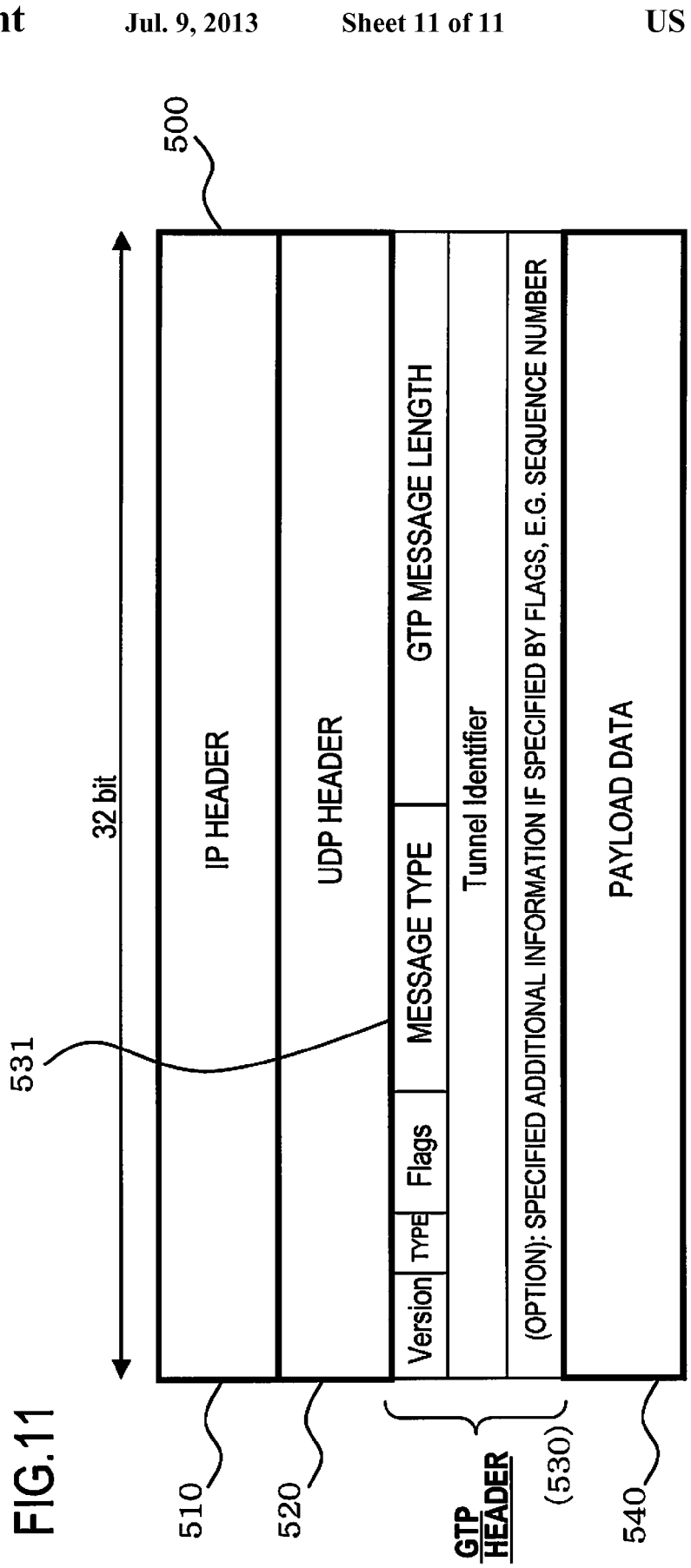
FIG. 11 diagram depicting another format example of a QoS request message.

A predetermined code to indicate a QoS request message may be inserted into the message identifier of the tunnel transfer protocol (e.g. GTP (GPRS (General Packet Radio Service) Tunneling Protocol) and GRE (General Routing Encapsulation)). FIG. 11 depicts this example, and a predetermined code is inserted into the message type field 531.

Referring back to FIG. 7, when the QoS request message is received, the core network node 10-*a* at the transmission side outputs the QoS request message to the QoS policy server 40-1 ((3-3) in FIG. 7). As FIG. 3 depicts, the data transfer unit 11 identifies that the received message is a QoS request message from the core network node 10-*b* at the receive side by referring to a protocol identifier of the IP protocol, or a port number of the transport layer protocol, or a message identifier of the tunnel transfer protocol. The QoS request message is output to the message processing unit for mobile station 12, and the message processing unit 12 outputs the QoS request information extracted from the QoS request message to the mobile station management unit 14 along with the identification information on the transmission destination mobile station 30-1. The mobile station management unit 14 acquires the identification information and IP address of the QoS policy server 40-1 which manages the mobile station 30-1 from the table, using the IP address of the transmission destination included in the QoS request information. The mobile station management unit 14 instructs the QoS policy server 40-1 to send the QOS request message to the message processing unit for QoS server 13. The message processing unit for QOS server 13 creates the QoS request message, and outputs it to the data transfer unit 11. The data transfer unit 11 outputs the QoS request message to the QoS policy server 40-1. The subsequent processing is executed in the same procedure (NW-initiated) as the transmission side in Embodiment 2, and QoS setting at the transmission side ends.

When the QoS request message is received from the core network node 10-b, the QoS policy server 40-1 at the transmission side identifies that the message is a QoS request message from the core network node 10-b at the receive side via the core network node 10-a at the transmission side based on the identifier to indicate a QoS request message depicted in FIG. 9 or the like. This identification is performed by the QoS setting message processing unit 42. For example, in the case of the QoS request message ((1-3)) depicted in FIG. 5, such an identifier is not included, so it can easily be identified whether the received message is the QoS request message via the core network node 10-b.

The QoS setting message processing unit 42 outputs the information to indicate this QoS request message to the mobile station service policy information management unit 44. The mobile station service policy information management unit 44 instructs the QoS setting message processing unit 42 to create a QoS setting request message with switching the IP addresses of the transmission source and the transmission destination so that the mobile station 30-1 becomes the transmission source, and the QoS policy server 40-1 becomes the transmission destination, in the same manner as in Embodiment 2. The QoS setting request message is output from the QoS policy server 40-1, and the QoS channel is set by the network initiated method, in the same manner as in Embodiment 2 or the like.

The core network node 10-b at the receive side, on the other hand, outputs the QoS request message to the QoS policy server 40-2, as depicted in FIG. 7. This and subsequent processings are executed in the same procedure as the receive side in Embodiment 2. By this, QoS setting at the receive side ends.

Now the effect of Embodiment 3 will be described. The number of messages from the mobile station 30-2 at the receive side outputting the QoS request message to the transmission side starting the QoS setting, is "three messages", (1-1) to (1-3) in Embodiment 1 (see FIG. 5), and is also "three messages" (3-1) to (3-3) in Embodiment 3. However the series of this "three messages" passes through the radio link three times in Embodiment 1. On the other hand, it passes through the radio link only once in Embodiment 3. The number of passages through the radio link in Embodiment 3 is less than in Embodiment 1. Since massage transfer over a radio link generally causes delays during communication, the QoS channel can be set quickly in Embodiment 3.

According to the present invention, a communication system which can set QoS appropriately, a communication method in the communication system, and a relay device thereof can be provided. Also according to the present invention, a communication system which sets QoS quickly can be provided.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has(have) been described in detail, it should be understood that the various changes, substitutions, and alterations could be made hereto without departing from the spirit and scope of the invention.

What is claimed is:

1. A communication system, comprising:
a first mobile station;
a first node which accommodates the first mobile station;
a first QoS server which holds service conditions of the first mobile station;
a second mobile station which is a communication counterpart of the first mobile station; and
a second QoS server which holds service conditions of the second mobile station, wherein
the first node includes a first transfer unit which receives a QoS request for requesting to set a QoS channel from the first mobile station and transfers the QoS request to the first QoS server; and a management unit which instructs the second QoS server to transfer the QoS request if the management unit judges based on the QoS request that the first node accommodates the second mobile station, the first transfer unit transfers the QoS request to the second QoS server based on the instruction from the management unit, and
the second QoS server includes a QoS setting message output unit which outputs a QoS setting message to instruct setting of a QoS channel to the second mobile station based on the QoS request.

2. The communication system according to claim 1, further comprising
a second node which accommodates the second mobile station, wherein
the management unit instructs the first transfer unit to send the QoS request to the second node if the management unit judges that the first node does not accommodate the second mobile station, and the first transfer unit sends the QoS request to the second node,
the second node includes a second transfer unit which transfers the QoS request from the first node to the second QoS server, and
the QoS setting message output unit outputs the QoS setting message based on the QoS request from the second node.

3. The communication system according to claim 2, wherein the first transfer unit inserts a code to indicate that the QoS request is the QoS request from the first node to the second node into a field for inserting a protocol identifier of IP protocol, and sends the QoS request to the second node.

4. The communication system according to claim 2, wherein the first transfer unit inserts a code to indicate that the QoS request is the QoS request from the first node to the second node into a field for inserting a port number of a transport layer protocol, and sends the QoS request to the second node.

5. The communication system according to claim 2, wherein the first transfer unit inserts a code to indicate that the QoS request is the QoS request from the first node to the second node into a field for inserting a message identifier of a tunnel protocol, and sends the QoS request to the second node.

6. The communication system according to claim 2, wherein the management unit includes a table to hold an address of each mobile station accommodated by the first node, and judges that the first node does not accommodate the second mobile station when an address of the second mobile station included in the QoS request from the first mobile station is not stored in said table.

7. The communication system according to claim 1, wherein the management unit includes a table to hold an address of each mobile station accommodated by the first node, and judges that the first node accommodates the second mobile station if an address of the second mobile station included in the QoS request from the first mobile station is stored in the table.

8. A communication system, comprising:
a first mobile station;
a first node which accommodates the first mobile station;
a first QoS server which holds service conditions of the first mobile station;
a second mobile station which is a communication counterpart of the first mobile station; and
a second node which accommodates the second mobile station, wherein
the first node includes a first transfer unit which receives a QoS request for requesting to set a QoS channel from the first mobile station and transfers the QoS request to the first QoS server; and management unit which instructs the first transfer unit to send the QoS request to the second node if the management unit judges based on the QoS request that the first node does not accommodate the second mobile station, and the first transfer unit sends the QoS request to the second node,
the second node includes a second transfer unit which transfers the QoS request from the first node to the second QoS server, and
the second QoS server includes a QoS setting message output unit which outputs a QoS setting message to instruct to set a QoS channel based on the QoS request from the first node, to the second mobile station.

9. A communication method in a communication system including a first mobile station; a first node which accommodates the first mobile station;
a first QoS server which holds service conditions of the first mobile station;
a second mobile station which is a communication counterpart of the first mobile station; and a second QoS server which holds service conditions of the second mobile station, the method comprising:
receiving a QoS request for requesting to set a QoS channel from the first mobile station, and transferring the QoS request to the second QoS server if the first node judges based on the QoS request that the first node accommodates the second mobile station, in the first node; and
outputting a QoS setting message to instruct to set a QoS channel to the second mobile station based on the QoS request, in the second QOS node.

10. A communication method in a communication system including a first mobile station; a first node which accommodates the first mobile station;
a first QoS server which holds service conditions of the first mobile station;
a second mobile station which is a communication counterpart of the first mobile station; and a second node which accommodates the second mobile station, the method comprising:
receiving a QoS request for requesting to set a QoS channel from the first mobile station, and sending the QoS request to the second core network node if the first node judges based on the QoS request that the first node does not accommodate the second mobile station, in the first node;
transferring the QoS request from the first node to the second QoS server, in the second node; and
outputting a QoS setting message to instruct to set a QoS channel to the second mobile station based on the QoS request from the second node, in the second QOS server.

11. A relay device accommodating a first mobile station, comprising:
a transfer unit which receives a QoS request for requesting to set a QoS channel from the first mobile station and transfers the QoS request to a first QoS server holding service conditions of the first mobile station; and
a management unit which sends the QoS request to a second QoS server holding service conditions of a second mobile station if the second mobile station of a communication counterpart of the first mobile station is accommodated by the relay device, based on said QoS request, and instructs the relay device accommodating the second mobile station to send the QoS request if the second mobile station is not accommodated by the relay device, wherein
the transfer unit sends the QoS request to the second QoS server or the relay device accommodating the second mobile station based on the instruction from the management unit.

* * * * *